US008628226B2

(12) United States Patent
Takahashi et al.

(10) Patent No.: US 8,628,226 B2
(45) Date of Patent: Jan. 14, 2014

(54) VEHICLE HEADLAMP UNIT HAVING MULTIPLE ADJACENT PROJECTION LENSES

(75) Inventors: Toru Takahashi, Tokyo (JP); Nobutaka Tezuka, Tokyo (JP)

(73) Assignee: Koito Manufacturing Co., Ltd., Tokyo (JP)

(*) Notice: Subject to any disclaimer, the term of this patent is extended or adjusted under 35 U.S.C. 154(b) by 174 days.

(21) Appl. No.: 13/027,380

(22) Filed: Feb. 15, 2011

(65) Prior Publication Data

US 2011/0199776 A1    Aug. 18, 2011

(30) Foreign Application Priority Data

Feb. 17, 2010   (JP) .................... 2010-032292

(51) Int. Cl.
*F21V 5/00* (2006.01)
*B60Q 1/00* (2006.01)

(52) U.S. Cl.
USPC ........................................ 362/538; 362/520

(58) Field of Classification Search
None
See application file for complete search history.

(56) References Cited

U.S. PATENT DOCUMENTS

| 6,578,997 | B2 * | 6/2003 | Futami | 362/522 |
| 6,776,513 | B2 * | 8/2004 | Albou | 362/507 |
| 8,123,388 | B2 * | 2/2012 | Ookubo | 362/512 |
| 2001/0008486 | A1 | 7/2001 | Futami | |
| 2002/0135280 | A1 * | 9/2002 | Taniuchi et al. | 313/111 |
| 2009/0122567 | A1 | 5/2009 | Mochizuki et al. | |

FOREIGN PATENT DOCUMENTS

| EP | 1243844 A2 | 9/2002 |
| EP | 1965126 A1 | 9/2008 |
| JP | 2006-134712 A | 5/2006 |
| JP | 2007-305575 A | 11/2007 |
| JP | 2008-71751 A | 3/2008 |
| JP | 2009-134963 A | 6/2009 |

OTHER PUBLICATIONS

Communication issued Aug. 14, 2012 by the European Patent Office in counterpart European Application No. 11154686.7.
Office Action, dated Aug. 12, 2013, issued by the State Intellectual Property Office of the People's Republic of China in counterpart Chinese Application No. 201110041234.7.
Office Action, dated Oct. 29, 2013, issued by the Japanese Patent Office in counterpart Japanese Patent Application No. 2010-032292.

* cited by examiner

*Primary Examiner* — Britt D Hanley
(74) *Attorney, Agent, or Firm* — Sughrue Mion, PLLC

(57) ABSTRACT

A vehicle headlamp unit has a plurality of projection lenses configured to project light from at least one light source. The plurality of projection lenses is configured and arranged such that each of the projection lenses includes an outer peripheral portion that faces and extends along the outer peripheral portion of an adjacent one of the projection lenses. The outer peripheral portion of each of the projection lenses touches or lies close to the outer peripheral portion of the adjacent one of the projection lenses such that light emitting areas of the plurality of projection lenses as a whole are visually recognized as a single light emitting area.

10 Claims, 9 Drawing Sheets

VEHICLE HEADLAMP UNIT HAVING MULTIPLE ADJACENT PROJECTION LENSES

CROSS-REFERENCE TO RELATED APPLICATION

The present application claims priority from Japanese Patent Application No. 2010-032292 filed on Feb. 17, 2010, the entire content of which is incorporated herein by reference.

FIELD OF INVENTION

The present invention relates to a lamp unit and, more particularly, to a headlamp unit for use in a vehicle such as an automobile.

DESCRIPTION OF RELATED ART

Some vehicle lamps have a plurality of lamp units to form respective partial light distribution patterns, and superimpose the partial light distribution patterns to form a desired light distribution pattern. When light emitting areas of the respective lamp units are separated from each other, however, other drivers or pedestrians may recognize the lamp units as separate light emitting parts. In this case, because a size of each of the light emitting parts may be relatively small, it may deteriorate a function of the lamp to show a presence of the vehicle, on which the lamp is mounted, to the other drivers or to the pedestrians (hereinafter, "vehicle marking function").

Accordingly, a related art vehicle lamp has, in addition to first and second lamp units, an auxiliary optical unit to improve the vehicle marking function (see, e.g., JP 2007-305575 A). More specifically, the first lamp unit has a first semiconductor light emitting device and a first reflector to reflect light from the first semiconductor light emitting device forward, and the second unit has a second semiconductor light emitting device and a second reflector to reflect light from the second semiconductor light emitting device forward. The first unit and the second unit together form a low beam. The auxiliary optical unit is arranged between the first and second lamp units. The auxiliary optical unit receives the light from the first and second lamp units, and sends the received light forward. The auxiliary optical unit is arranged such that a light emitting area thereof connects the light emitting areas of the first and second lamp units so that the vehicle lamp is visually recognized to have a single light emitting area as a whole.

BRIEF SUMMARY

Illustrative aspects of the present invention provide a vehicle headlamp unit configured to improve the vehicle marking function without increasing the number of components.

According to an illustrative aspect of the present invention, a vehicle headlamp unit is provided. The vehicle headlamp unit includes at least one light source, and a plurality of projection lenses configured to project light from the at least one light source. The plurality of projection lenses is configured and arranged such that each of the projection lenses includes an outer peripheral portion that faces and extends along the outer peripheral portion of an adjacent one of the projection lenses. The outer peripheral portion of each of the projection lenses touches or lies close to the outer peripheral portion of the adjacent one of the projection lenses such that light emitting areas of the plurality of projection lenses as a whole are visually recognized as a single light emitting area.

According to another illustrative aspect of the present invention, a vehicle headlamp unit is provided. The vehicle headlamp unit includes at least one light source, and a plurality of projection lenses configured to project light from the at least one light source. Each of the projection lenses has a noncircular shape when observed from a front view, and includes a side that causes the shape of the projection lens to be noncircular. The side of each of the projection lenses touches or lies close to the side of an adjacent one of the projection lenses such that light emitting areas of the plurality of projection lenses as a whole are visually recognized as a single light emitting area.

Other aspects and advantages of the invention will be apparent from the following description, the drawings and the claims.

DETAILED DESCRIPTION

Hereinafter, exemplary embodiments of the present invention will be described in detail with reference to the drawings. However, the following exemplary embodiments do not limit the scope of the claimed invention, and not all the features of the exemplary embodiments or combinations thereof are necessarily required for the present invention.

Figure 1A:
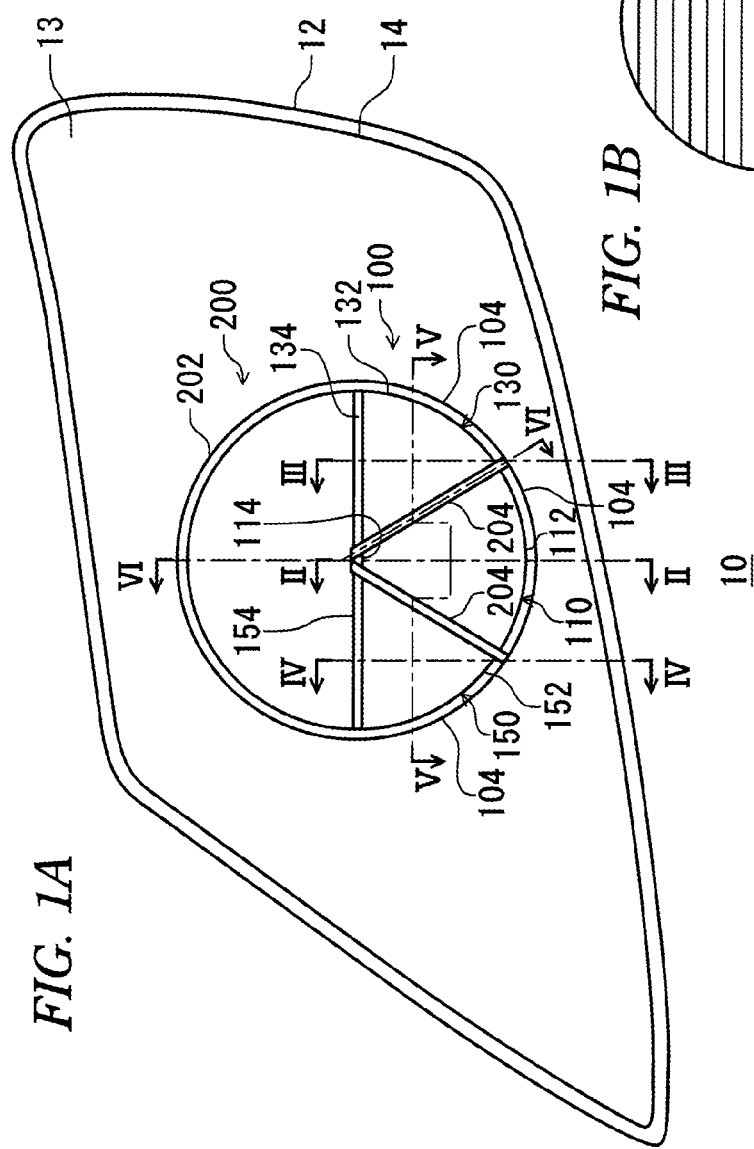
FIG. 1A is a schematic front view of a vehicle headlamp according to a first exemplary embodiment of the present invention.

FIGS. 1A to 6 illustrate a vehicle headlamp according to a first exemplary embodiment of the present invention. The headlamp is mounted on a vehicle in a pair on right and left portions of a front side of the vehicle. The right headlamp and the left headlamp have a symmetric configuration. FIG. 1A illustrates the left headlamp 10.

As shown in FIG. 1A, the vehicle headlamp 10 includes a lamp body 12 having a front opening, and an outer cover 14 arranged to cover the opening of the lamp body 12 to form a lamp chamber 13 together with the lamp body 12. The outer cover 14 is made of a transparent resin or glass. Inside the lamp chamber 13, the headlamp 10 further includes a first lamp unit 100 and a second lamp unit 200. The first lamp unit 100 is configured to form a high beam light distribution pattern and a low beam light distribution pattern. The second lamp unit 200 is configured to form a light distribution pattern other than the high beam light distribution pattern and the low beam light distribution pattern.

The light distribution pattern other than the high beam light distribution pattern and the low beam light distribution pattern may be an additional light distribution pattern formed in addition to and simultaneously with the high beam light distribution pattern or the low beam light distribution pattern, an auxiliary light distribution pattern (e.g., a fog lamp), or an indicating light distribution pattern (e.g., a daytime running lamp, a turn signal lamp, a clearance lamp, etc.). According to this exemplary embodiment, the second lamp unit 200 is a turn signal lamp unit configured to function as a direction indicator.

The first lamp unit 100 and the second lamp unit 200 may be attached to the lamp body 12 such that their optical axes are adjustable in the horizontal direction and/or in the vertical direction.

As shown in FIG. 2 to FIG. 5, the first lamp unit 100 is a projector type lamp unit, and includes a first sub-unit 110, a second sub-unit 130 and a third sub-unit 150. The first sub-unit 110, the second sub-unit 130 and the third sub-unit 150 are all projector type sub-units.

Figure 2:
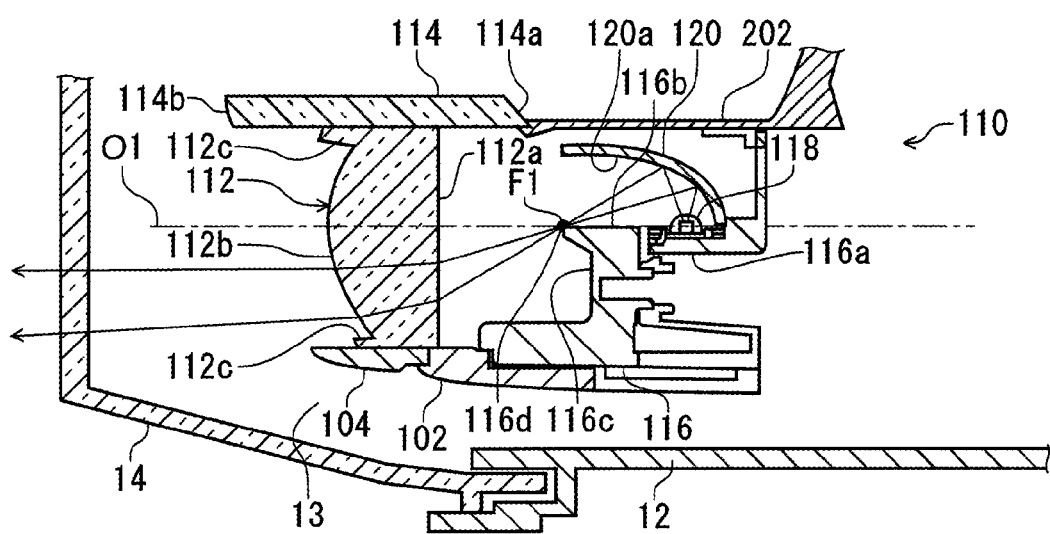
FIG. 2 is a vertical sectional view taken along the line II-II of FIG. 1A.
Figure 5:
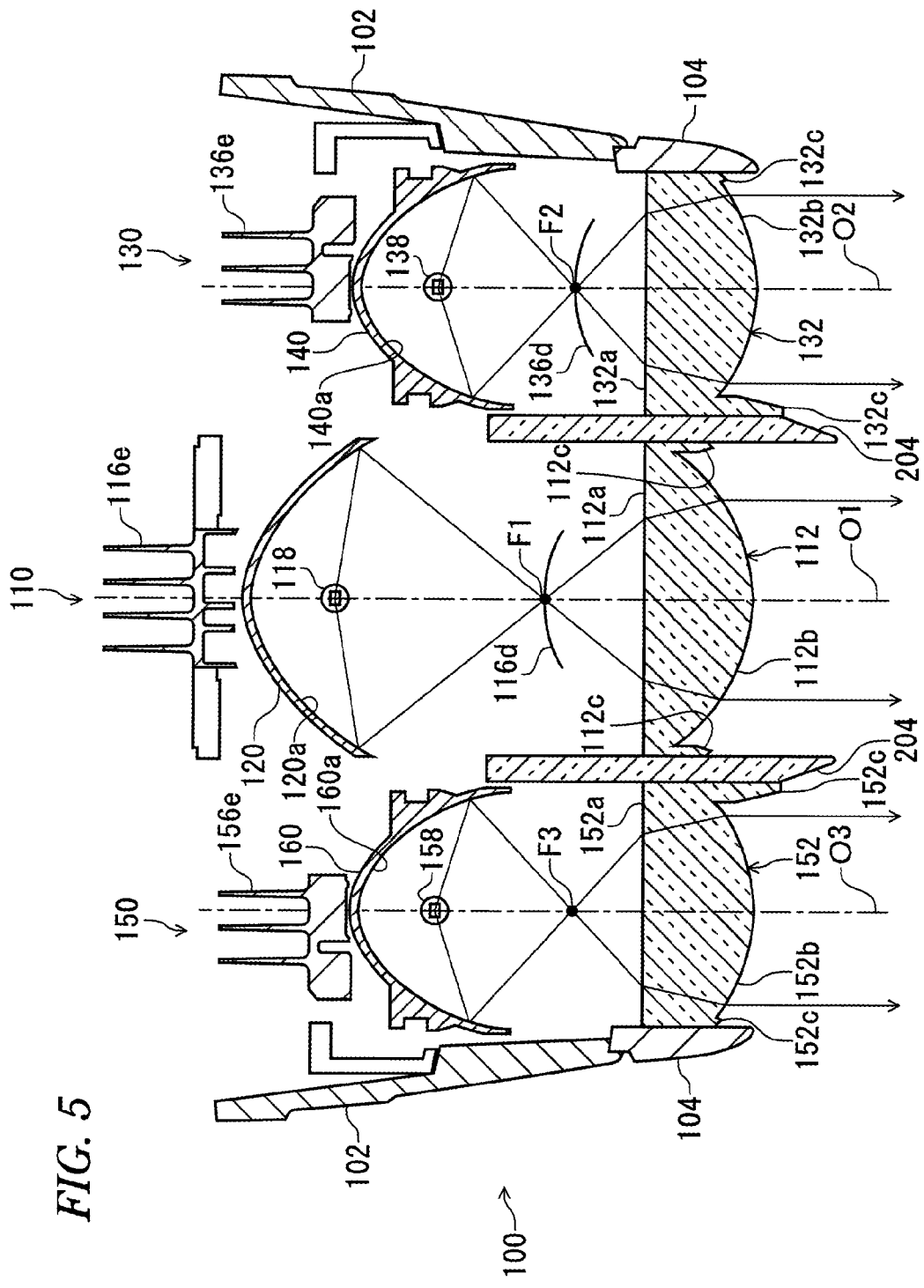
FIG. 5 is a horizontal sectional view taken along the line V-V of FIG. 1A.

As shown in FIG. 2 and FIG. 5, the first sub-unit 110 includes a projection lens 112, a lens holder 114, a heat sink 116, a light source module 118, and a reflector 120.

The projection lens 112 is an optical member for sending the light from the light source module 118 forward from the vehicle. More specifically, the projection lens 112 is a plano-convex aspherical lens having a convex front surface and a flat rear surface. Hereinafter, the rear surface of the projection lens 112 may be referred to as a light input surface 112a, and the front surface of the projection lens 112 may be referred to as a light output surface 112b. The projection lens 112 is configured such that an image on a rear focal plane including a rear focal point F1 of the projection lens 112 is projected as an inverted image on a virtual vertical screen in front of the lamp. The projection lens 112 is provided on an optical axis O1 of the first sub-unit 110 such that a second focal point of the reflector 120 is located on or in the vicinity of the rear focal point F1.

The lens holder 114 has a lower face abutting on an upper side of an outer peripheral portion of the projection lens 112, and a rear end portion connected to a unit body 202 of the second lamp unit 200. The lens holder 114 is a light guide made of a transparent resin or glass, and is configured such that light from a light source bulb 208, which is a light source of the second lamp unit 200, is taken in from a rear end face of the lens holder 114 and is output from a front end face of the lens holder 114. Hereinafter, the rear end face of the lens holder 114 may be referred to as a light input surface 114a, and the front end face of the lens holder 114 may be referred to as a light output surface 114b.

An inner surface of a unit frame 104 abuts on a lower side of the outer peripheral portion of the projection lens 112. The unit frame 104 is attached to a front end face of a unit body 102 of the first lamp unit 100. Side surfaces of light guides 204 of the second lamp unit 200 abut respectively on lateral sides of the outer peripheral portion of the projection lens 112. Accordingly, the projection lens 112 is fixed on the optical axis O1 of the first sub-unit 110 by the lens holder 114, the unit frame 104 and the light guides 204 (see FIG. 1).

The projection lens 112 has an edge portion 112c protruding forward in the direction of the optical axis. The edge portion 112c abuts on the surfaces of the lens holder 114, the unit frame 104 and the light guide 204 respectively. Thus, contact areas between the projection lens 112 and the surfaces of the lens holder 114, the unit frame 104 and the light guide 204 can be respectively increased, so that the projection lens 112 is stably fixed.

The heat sink 116 is configured to hold the light source module 118. That is, the heat sink 116 has a light source module mounting portion 116a on which the light source module 118 is mounted. The light source module 118 includes a semiconductor light emitting device such as a light emitting diode (LED), a substrate on which the semiconductor light emitting device is mounted, and a substantially semi-spherical cap. The substrate is a thermally conductive and electrically insulative substrate made of ceramic or the like. On the substrate, electrodes are formed to feed electric power to the semiconductor light emitting device. The light source module 118 is mounted on the light source module mounting portion 116a such that a light emitting surface of the semiconductor light emitting device is oriented upward in the vertical direction.

The heat sink 116 further has a flat portion 116b extending substantially horizontally forward from the light source module mounting portion 116a, and a curved portion 116c which is bent downward from the front of the flat portion 116b in a recessed manner. An edge line 116d formed by the flat portion 116b and the curved portion 116c has a form corresponding to a cut-off line of a diffused pattern of the low beam light distribution pattern.

The heat sink 116 has a lower end portion connected to an inner surface of the unit body 102. Further, the heat sink 116 has heat dissipating fins 116e on a rear side of the first sub-unit 110 to dissipate heat generated by the semiconductor light emitting device.

On the heat sink 116, the reflector 120 is mounted. The reflector 120 has one end fixed to the light source module mounting portion 116a, and a reflecting surface 120a on an inner side. The reflecting surface 120a may be formed as a portion of ellipsoid surface. The reflector 120 is arranged such that the semiconductor light emitting device of the light source module 118 is located on or in the vicinity of a first focal point of the reflecting surface 120a and the rear focal point F1 of the projection lens 112 is located on or in the vicinity of the second focal point of the reflecting surface 120a.

Figure 3:
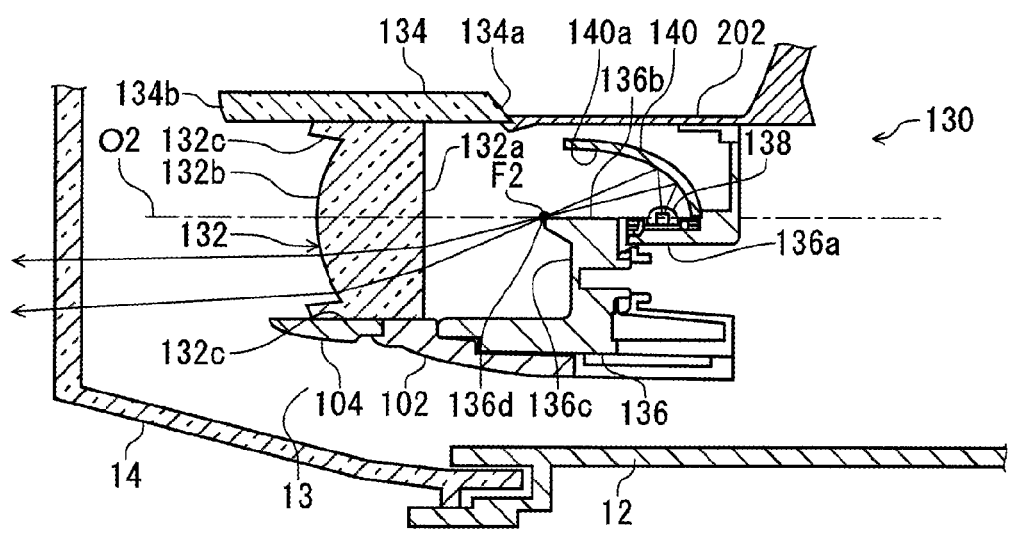
FIG. 3 is a vertical sectional view taken along the line III-III of FIG. 1A.

As shown in FIG. 3, the second sub-unit 130 includes a projection lens 132, a lens holder 134, a heat sink 136, a light source module 138, and a reflector 140.

The projection lens 132 is an optical member for sending the light from the light source module 138 forward from the vehicle. More specifically, the projection lens 132 is a plano-convex aspherical lens having a convex front surface and a flat rear surface. Hereinafter, the rear surface of the projection lens 132 may be referred to as a light input surface 132a and the front surface of the projection lens 132 may be referred to as a light output surface 132b. The projection lens 132 is configured such that an image on a rear focal plane including a rear focal point F2 of the projection lens 132 is projected as an inverted image on a virtual vertical screen arranged in front of the lamp. The projection lens 132 is provided on an optical axis O2 of the second sub-unit 130 such that a second focal point of the reflector 140 is located on or in the vicinity of the rear focal point F2.

The lens holder 134 has a lower surface abutting on an upper side of an outer peripheral portion of the projection lens 132, and a rear end portion connected to the unit body 202 of the second lamp unit 200. The lens holder 134 is a light guide made of a transparent resin or glass, and is configured such that the light from the light source bulb 208 is taken in from a rear end face of the lens holder 134 and is output from a front end face of the lens holder 134. Hereinafter, the rear end face of the lens holder 134 may be referred to as a light input surface 134a, and the front end face of the lens holder 134 may be referred to as a light output surface 134b.

A side surface of one of the light guides 204 abuts on the outer peripheral portion of the projection lens 132 on a side close to the first sub-unit 110. Moreover, the inner surface of the unit frame 104 abuts on a remaining portion of the outer peripheral portion of the projection lens 132. Accordingly, the projection lens 132 is fixed on the optical axis O2 of the second sub-unit 130 by the lens holder 134, the unit frame 104 and the light guide 204 (see FIG. 1).

The projection lens 132 has an edge portion 132c protruding forward in the direction of the optical axis. The edge portion 132c abuts on the surfaces of the lens holder 134, the unit frame 104 and the light guide 204 respectively. Thus, contact areas between the projection lens 132 and the surfaces of the lens holder 134, the unit frame 104 and the light guide 204 can be respectively increased, so that the projection lens 132 is stably fixed.

The heat sink 136 is configured to hold the light source module 138. That is, the heat sink 136 has a light source module mounting portion 1316a on which the light source module 138 is mounted. Like the light source module 118, the light source module 138 includes a semiconductor light emitting device, a substrate and a substantially semi-spherical cap. The light source module 138 is mounted on the light source module mounting portion 136a such that a light emitting surface of the semiconductor light emitting device is oriented upward in the vertical direction.

The heat sink 136 further has a flat portion 136b extending substantially horizontally forward from the light source module mounting portion 136a, and a curved portion 136c which is bent downward from the front of the flat portion 136b in a recessed manner. An edge line 136d formed by the flat portion 136b and the curved portion 136c has a form corresponding to a cut-off line of a cut line pattern of the low beam light distribution pattern.

The heat sink 136 has a lower end portion connected to the inner surface of the unit body 102. Further, the heat sink 136 has heat dissipating fins 136e on a rear side of the second sub-unit 130 to dissipate heat generated by the semiconductor light emitting device.

On the heat sink 136, the reflector 140 is mounted. The reflector 140 has one end fixed to the light source module mounting portion 136a, and a reflecting surface 140a on an inner side, which may be formed as a portion of an ellipsoid surface. The reflector 140 is arranged such that the semiconductor light emitting device of the light source module 138 is located on or in the vicinity of a first focal point of the reflecting surface 140a and the rear focal point F2 of the projection lens 132 is located on or in the vicinity of the second focal point of the reflecting surface 140a.

Figure 4:
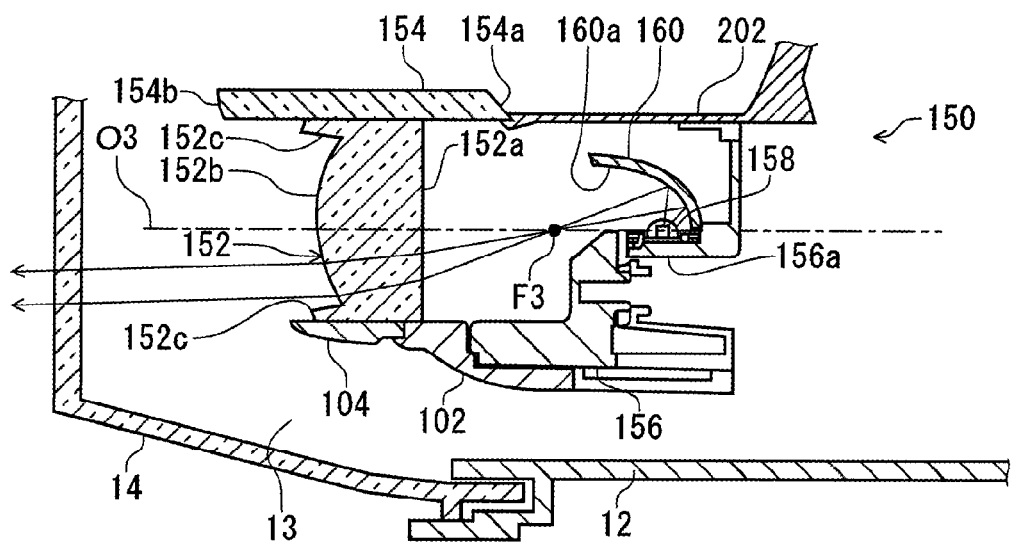
FIG. 4 is a vertical sectional view taken along the line IV-IV of FIG. 1A.

As shown in FIG. 4, the third sub-unit 150 includes a projection lens 152, a lens holder 154, a heat sink 156, a light source module 158, and a reflector 160.

The projection lens 152 is an optical member sending the light from the light source module 158 forward from the vehicle. More specifically, the projection lens 152 is a plano-convex aspherical lens having a convex front surface and a flat rear surface. Hereinafter, the rear surface of the projection lens 152 may be referred to as a light input surface 152a, and the front surface of the projection lens 152 may be referred to as a light output surface 152b. The projection lens 152 is configured such that an image on a rear focal plane including a rear focal point F3 of the projection lens 152 is projected as an inverted image on a virtual vertical screen in front of the lamp. The projection lens 152 is provided on an optical axis O3 of the third sub-unit 150 such that a second focal point of the reflector 160 is located on or in the vicinity of the rear focal point F3.

The lens holder 154 has a lower surface abutting on an upper side of an outer peripheral portion of the projection lens 152, and a rear end portion connected to the unit body 202 of the second lamp unit 200. The lens holder 154 is a light guide made of a transparent resin or glass, and is configured such that the light from the light source bulb 208 is taken in from a rear end face of the lens holder 154 and is output from a front end face. Hereinafter, the rear end face of the lens holder 154 may be referred to as a light input surface 154a, and the front end face of the lens holder 154 may be referred to as a light output surface 154b.

A side surface of the other of the light guides 204 abuts on the outer peripheral portion of the projection lens 152 on a side close to the first sub-unit 110. Further, the inner surface of the unit frame 104 abuts on the remaining portion of the outer peripheral portion of the projection lens 152. Accordingly, the projection lens 152 is fixed on the optical axis O3 of the third sub-unit 150 by the lens holder 154, the unit frame 104 and the light guide 204 (see FIG. 1).

The projection lens 152 has an edge portion 152c protruding forward in the direction of the optical axis. The edge portion 152c abuts on the surfaces of the lens holder 154, the unit frame 104 and the light guide 204 respectively. Thus, contact areas between the projection lens 152 and the surfaces of the lens holder 154, the unit frame 104 and the light guide 204 can be respectively increased, so that the projection lens 152 is stably fixed.

The heat sink 156 is configured to hold the light source module 158. That is, the heat sink 156 has a light source module mounting portion 156a on which the light source module 158 is mounted. Like the light source module 118, the light source module 158 includes a semiconductor light emitting device, a substrate, and a substantially semi-spherical cap. The light source module 158 is mounted on the light source module mounting portion 156a such that a light emitting surface of the semiconductor light emitting device is oriented upward in the vertical direction.

The heat sink 156 has a lower end portion connected to the inner surface of the unit body 102. Further, the heat sink 156 has heat dissipating fins 156e on a rear side of the third sub-unit 150 to dissipate heat generated by the semiconductor light emitting device.

On the heat sink 156, the reflector 160 is mounted. The reflector 160 is has one end fixed to the light source module mounting portion 156a, and a reflecting surface 160a on an inner side, which may be formed as a portion of an ellipsoid surface. The reflector 160 is arranged such that the semiconductor light emitting device of the light source module 158 is located on or in the vicinity of a first focal point of the reflecting surface 160a and the rear focal point F3 of the projection lens 152 is located on or in the vicinity of the second focal point of the reflecting surface 160a.

Figure 1B:
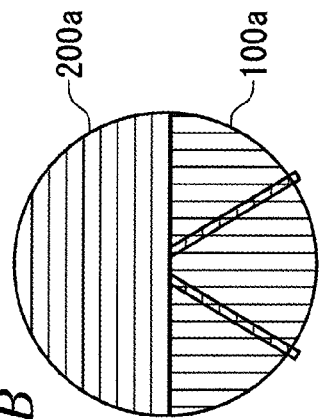
FIG. 1B is a diagram illustrating apparent light emitting areas of a first lamp unit and a second lamp unit.

As shown in FIG. 1A, the first lamp unit 100 is configured such that the projection lens 112 of the first sub-unit 110, the projection lens 132 of the second sub-unit 130, and the projection lens 152 of the third sub-unit 150 are arranged on a plane. Further, each of the projection lenses 112, 132, 152 has an outer periphery portion that faces the outer peripheral portion of an adjacent one of the projection lenses. The outer peripheral portion of each of the projection lenses 112, 132, 152 has a contour that extends along the outer periphery of the adjacent one of the projecting lenses. The first lamp unit 100 is configured such that the projection lenses 112, 132, 152 are combined together to arrange the adjacent ones of the outer peripheral portions close to each other so that, as shown in FIG. 1B, light emitting areas of the projection lenses 112, 132, 152 as a whole are visually recognized as a single light emitting area 100*a*. A distance between the adjacent projection lenses is, for example, about 15 mm or shorter.

According to this exemplary embodiment, each of the projection lenses 112, 132, 152 has a noncircular shape when observed from the front view. Each of the projection lenses 112, 132, 152 has a side that causes the shape to be noncircular. The projection lenses 112, 132, 152 are arranged such that the sides of adjacent ones of the projection lenses 112, 132, 152 that causes the noncircular shapes lie close to each other, so that the light emitting areas of the projection lenses 112, 132, 152 as a whole are visually recognized as the single light emitting area 100*a*.

More specifically, each of the projection lenses 112, 132, 152 has a substantially sector shape when observed from the front view. The projection lens 112 and the projection lens 132 are arranged such that the straight line sections of the outer peripheral portions (radius sections of the sector shapes) face each other. Likewise, the projection lens 112 and the projection lens 152 are arranged such that the straight line sections of the outer peripheral portions (radius sections of the sector shapes) face each other. The projection lenses 112, 132, 152 are combined together such that the entire first lamp unit 100 has a substantially sector shape when observed from the front view. In this exemplary embodiment, the first lamp unit 100 has a substantially semi-circular shape when observed from the front view. The "substantially sector shape" includes not only a sector of a true circle but also a shape that is close to a circle sector, for example, a shape having a dimensional error caused during the production of the projection lens.

As described above, in the first lamp unit 100, the projection lenses 112, 132, 152 are combined together such that one of the opposed outer peripheral portions of the plurality of projection lenses 112, 132, 152 arrange on the plane extends along the other of the opposed outer peripheral portions, and these outer peripheral portions are arranged to lie close to each other. Accordingly, the light emitting areas of the first sub-unit 110, the second sub-unit 130 and the third sub-unit 150 as a whole are visually recognized as the one light emitting area 100*a*. Therefore, it is possible to cause the sub-units to be visually recognized as a single light emitting part by pedestrians and other drivers, without providing an auxiliary optical unit as in the related art. Accordingly, the vehicle marking function of the headlamp 10 can be improved without increasing the number of components.

Further, the first lamp unit 100 is formed by combining the first sub-unit 110, the second sub-unit 130 and the third sub-unit 150, each having the projection lens 112, 132, 152 of a substantially sector shape, and as a whole has a substantially sector shape. Thus, it is possible to provide the headlamp 10 of an innovative design. Accordingly, it is possible to call more attention of the pedestrians and other drivers. A shape of each of the projection lenses or the combinations of the projection lenses may be changed to modify the first lamp unit 100 to have various shapes, so that the first lamp unit 100 can be applied to headlamps 10 of vehicles having various forms.

Each of the projection lenses 112, 132, 152 having the noncircular shape in the front view may be formed by removing at least a portion of an outer peripheral portion of a projection lens having a basic form of a substantially circular shape in the front view. In this case, each of the outer peripheral portions of the projection lenses 112, 132, 152 formed by cutting the outer peripheral portion of the basic circular shape includes a paraxial outer peripheral portion which is closer to its optical axis than the outer peripheral portion of the basic circular shape. When each of the projection lenses 112, 132, 152 has a substantially sector shape in the front view, the straight line sections of the outer peripheral portion correspond to the paraxial outer peripheral portions. In the first lamp unit 100, the projection lenses 112, 132, 152 are combined together such that the paraxial outer peripheral portions of the adjacent projection lenses lie close to each other. Thus, the optical axes O1, O2 and O3 of the sub-units are arranged close to each other. Generally, in the light emitting area, a central area including the optical axis has higher luminance than an outer side area. Accordingly, when the optical axes of the sub-units are arranged to lie close to each other, the sub-units can be visually recognized more positively as a single light emitting part by the pedestrians and other drivers. That is, the light emitting areas of the plurality of projection lenses 112, 132, 152 can be visually recognized more positively as a single light emitting area 100*a*. Further, the first lamp unit 100 can be downsized by arranging the paraxial outer peripheral portions of the adjacent projection lenses to lie close to each other.

Each of the projection lenses 112, 132, 152 having a noncircular shape in the front view may not be formed from the projection lens having a circular shape in the front view, and may also be formed by molding a lens plate member.

Each of the projection lenses 112, 132, 152 has the edge portion 112*c*, 132*c*, 152*c*. This causes the respective shapes of the projection lenses 112, 132, 152 to be visually recognized more clearly, so that the headlamp 10 having an innovative design can be provided. As a result, it is possible to call more attention of the pedestrians and other drivers.

Figure 6:
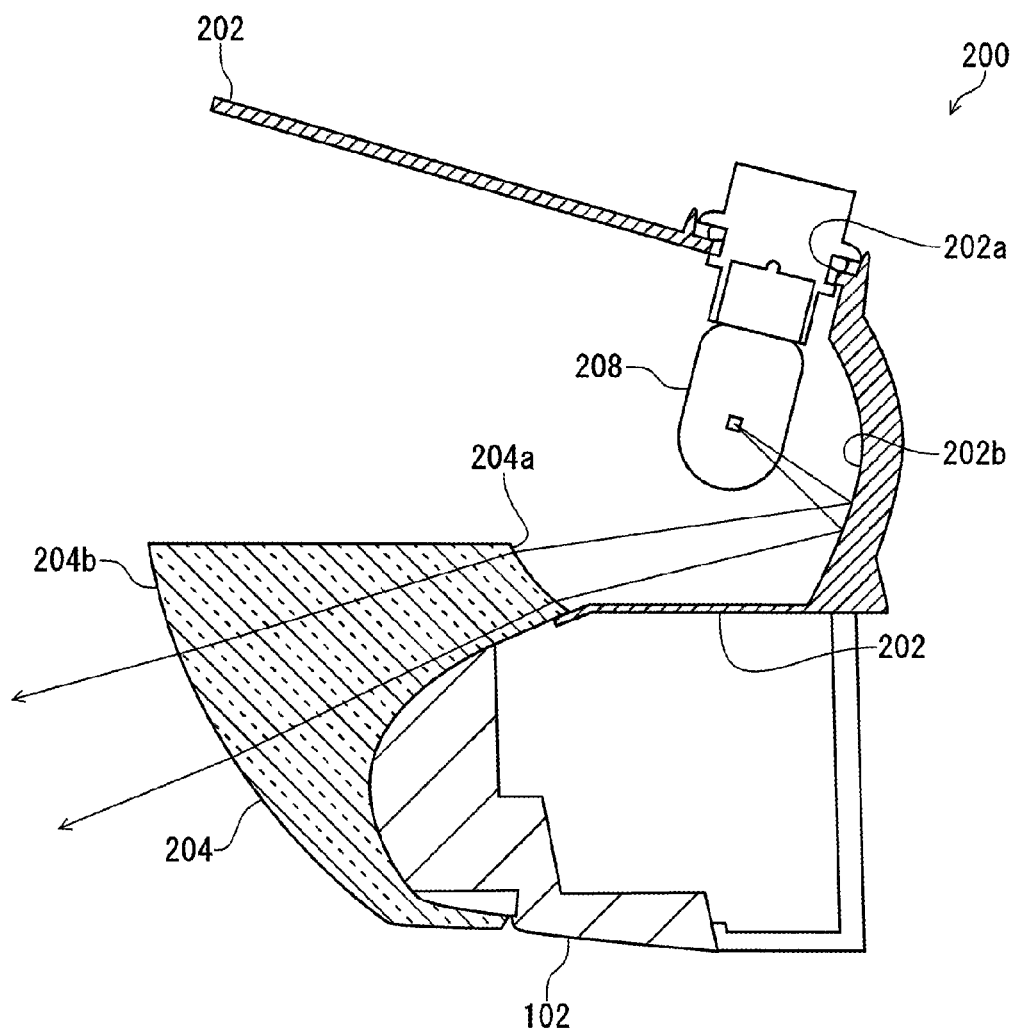
FIG. 6 is a sectional view taken along the line VI-VI of FIG. 1A.

Next, the second lamp unit 200 will be described with reference to FIG. 6. FIG. 6 is a schematic sectional view taken along the line VI-VI of FIG. 1A. The second lamp unit 200 has a substantially semi-circular shape in a front view, and is arranged above the first lamp unit 100 (see FIG. 1A). The first lamp unit 100 and the second lamp unit 200 are combined to form a combination lamp unit having a substantially circular shape in a front view.

As shown in FIG. 6, the second lamp unit 200 includes the unit body 202, the light guides 204, and the light source bulb 208.

The unit body 202 has a front opening of a substantially semi-circular shape in a front view. The front end portion of a horizontally extending outer peripheral portion (a diameter portion of the semi-circle) of the unit body 202 is connected to the rear end faces of the lens holders 114, 134, 154 (see FIGS. 2 to 4). The round outer peripheral portion (a circular arc portion of the semi-circle) of the unit body 202 is formed as a one-piece structure together with the unit frame 104 of the first lamp unit 100. An upper portion of the unit body 202 has a bulb insert hole 202*a* into which the light source bulb 208 is inserted. An inner peripheral surface of the unit body 202 has a reflecting surface 202*b* which reflects the light from the light source bulb 208 toward the light guides 204. Accordingly, the unit body 202 functions as a reflector.

Each of the light guides 204 has one end arranged near the light source bulb 208 and the other end extending into the visually recognizable light emitting area 100*a* of the first lamp unit 100 to output the light from the light source bulb 208 from the visually recognizable light emitting area 100*a* of the first lamp unit 100. More specifically, each of the light guides 204 is made of a transparent resin or glass, and is provided to extend between the closely arranged ones of the outer peripheral portions of the projection lenses 112, 132, 152 of the first lamp unit 100. In this exemplary embodiment, the second lamp unit 200 has two light guides 204, one provided between the projection lens 112 and the projection lens 132, and the other provided between the projection lens 112 and the projection lens 152. Each of the light guides 204 are arranged such that a light input surface 204a is located near the light source bulb 108 and a light output surface 204b is provided so as to be directed to the front side of the vehicle in a gap between the closely arranged ones of the outer peripheral portions of the adjacent projection lenses.

Accordingly, as shown in FIG. 1B, the second lamp unit 200 is configured such that, at least a portion of its visually recognizable light emitting area 200a overlaps the visually recognizable light emitting area 100a of the first lamp unit 100. That is, a portion of the light emitting area 200a of the second lamp unit 200 formed by the light output surfaces 204b of the light guides 204 overlaps the visually recognizable light emitting area 100a of the first lamp unit 100. Therefore, as compared with a vehicle headlamp in which an indicating lamp unit and a headlamp unit are spaced from each other, it is possible to provide the headlamp 10 with an innovative design, thereby improving function of calling attention of the pedestrians and other drivers.

As described above, the headlamp 10 is configured such that the second lamp unit 200 is arranged to touch the first lamp unit 100, and the light guides 204 extend into the visually recognizable light emitting area 100a of the first lamp unit 100 so that a portion of the light from the light source bulb 208 is output from the visually recognizable light emitting area 100a of the first lamp unit 100. More specifically, the light guides 204 are arranged to extend between the closely arranged portions of the outer peripheral portions of the adjacent projection lenses. Thus, a portion of the visually recognizable light emitting area 200a of the second lamp unit 200 can overlap the visually recognizable light emitting area 100a of the first lamp unit 100. Further, it is possible to provide a compact combination lamp unit having the first lamp unit 100 and the second lamp unit 200. Accordingly, the combination type headlamp 10 can be downsized.

Further, the projection lenses 112, 132, 152 of the first lamp unit 100 are configured such that the gaps between the closely arranged outer peripheral portions of the adjacent projection lenses extend in radial directions, and the light guides 204 are arranged to extend in these gaps. Therefore, the light distribution pattern of the second lamp unit 200 can be made to look expansive. Accordingly, it is possible to further improve the attention calling function. Further, the attention calling function is improved even when the first lamp unit 100 and the second lamp unit are not turned on.

Now, operations of the headlamp 10 having the configuration described above will be described. In FIGS. 2 to 6, arrow marks show light rays. When a driver operates a light switch (not shown) to instruct a low beam, a vehicle control ECU or a vehicle lamp ECU (both not shown) controls a power circuit (not shown) to turn on the first sub-unit 110 and the second sub-unit 130 of the first lamp unit 100, whereby the light source modules 118, 138 are supplied with electric power to emit light.

When the driver operates the light switch to instruct a high beam, the vehicle control ECU or the lamp ECU controls the power circuit to turn on the first sub-unit 110, the second sub-unit 130 and the third sub-unit 150 of the first lamp unit 100, whereby the light source modules 118, 138, 158 are supplied with electric power to emit light.

When the driver operates a turn lamp switch to instruct the turn signal lamp to be turned on, the vehicle control ECU or the lamp ECU controls the power circuit to turn on the second lamp unit 200, whereby the light source bulb 208 is supplied with electric power to emit light.

In the sub-unit 110 of the first lamp unit 100, the light from the light source module 118 is reflected by the reflecting surface 120a of the reflector 120 toward the projection lens 112. The light reflected by the reflecting surface 120a travels near the rear focal point F1 of the projection lens 112, that is, near the edge line 116d of the heart sink 116, and enters the projection lens 112 from the light input surface 112a. The light that has entered the projection lens 112 is output from the light output surface 112b so as to be directed forward from the vehicle.

In the second sub-unit 130 of the first lamp unit 100, the light from the light source module 138 is reflected by the reflecting surface 140a of the reflector 140 toward the projection lens 132. The light reflected by the reflecting surface 140a travels near the rear focal point F2 of the projection lens 132, that is, near the edge line 136d of the heart sink 136, and enters the projection lens 132 from the light input surface 132a of the projection lens 132. The light that has entered the projection lens 132 is output from the light output surface 132b so as to be directed forward from the vehicle.

In the third sub-unit 150 of the first lamp unit 100, the light from the light source module 158 is reflected by the reflecting surface 160a of the reflector 160 toward the projection lens 152. The light reflected by the reflecting surface 160a travels near the rear focal point F3 of the projection lens 152, and enters the projection lens 152 from the light input surface 152a of the projection lens 152. The light that has entered the projection lens 152 is output from the light output surface 152b so as to be directed forward from the vehicle.

In the second lamp unit 200, a portion of the light from the light source bulb 208 is directly, or after being reflected by the reflecting surface 202b, output so as to be directed forward from the vehicle. Another portion of the light from the light source bulb 208 is reflected by the reflecting surface 202b toward the light guide 204. This portion of the light reflected by the reflecting surface 202b enters the light guides 204 from the light input surfaces 204a of the respective light guides 204 and exits from the light output surfaces 204b of the respective light guides 204 so as to be directed forward from the vehicle. Yet another portion of the light from the light source bulb 208 is reflected by the reflecting surface 202b to enter the lens holders 114, 134, 154 from the light input surfaces 114a, 134a, 154a of the respective lens holders 114, 134, 154. This portion of the light that has entered the lens holders 114, 134, 154 is output from the light output surfaces 114b, 134b, 154b so as to be directed forward from the vehicle.

Figure 7:
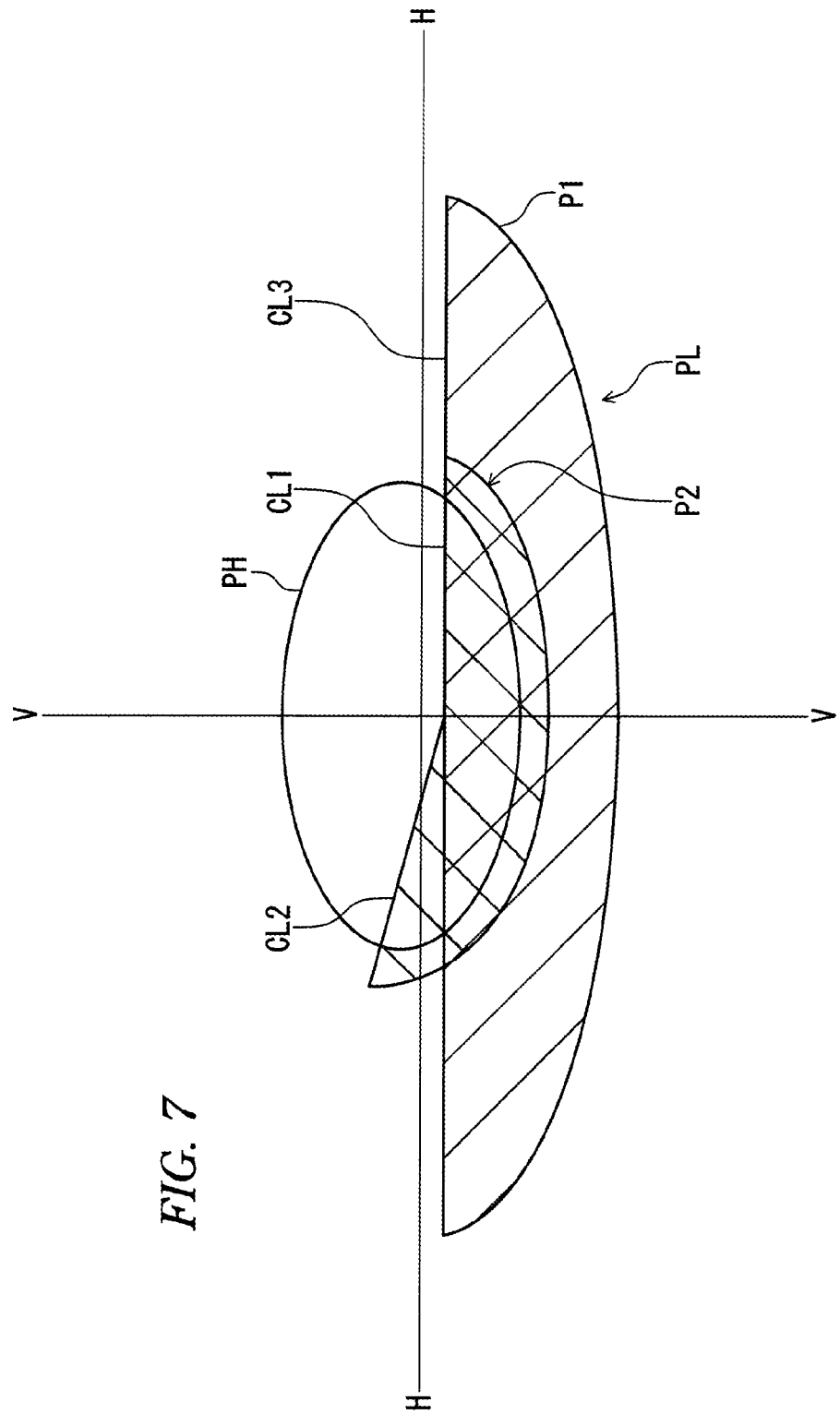
FIG. 7 is a diagram illustrating a light distribution pattern formed by the first lamp unit.

Now, the light distribution pattern formed by the first sub-unit 110, the second sub-unit 130 and the third sub-unit 150 of the first lamp unit 100 will be described. FIG. 7 is an explanatory diagram illustrating light distribution patterns to be formed by the first lamp unit 100. The light distribution patterns illustrated in FIG. 7 are formed on the virtual vertical screen arranged, for example, 25 m in front of the lamp.

The first lamp unit 100 is configured such that at least two of the projection lenses 112, 132, 152 may project the different light distribution patterns. In this exemplary embodiment, the first sub-unit 110 and the second sub-unit 130 are configured so as to form partial light distribution patterns that form the low beam light distribution pattern. The third sub-unit 150 is configured so as to form the high beam light distribution pattern.

More specifically, the first sub-unit 110 is configured to form a diffused pattern P1 forming a low beam light distribution patter PL. The diffused pattern P1 has a horizontal cut-off line CL3 extending in the horizontal direction below the line H-H, and is diffused more outward in the horizontal direction than a cut line pattern P2 which will be described below. The diffused pattern P1 has such a shape that a substantially semi-circular pattern is laterally expanded with a circular arc portion directed downward. The horizontal cut-off line CL3 is a line formed by the edge line 116d of the heat sink 116.

The second sub-unit 130 is configured to form the cut line pattern P2 forming the low beam light distribution pattern PL. The cut line pattern P2 includes a horizontal cut-off line CL1 extending in the horizontal direction on the right side of the line V-V and below the line H-H and an oblique cut-off line CL2 extending obliquely leftward and upward at an inclination angle of about 15° from an intersection of the horizontal cut-off line CL1 and the line V-V. The horizontal cut-off line CL1 and the oblique cut-off line CL2 are lines formed by the edge line 136d of the heat sink 136.

The low beam light distribution pattern PL is formed by combining the diffused pattern P1 and the cut line pattern P2. The low beam light distribution pattern PL is configured such that the horizontal cut-off line CL1 is located in the right side of the line V-V (an opposing lane side in the left-hand traffic) and the oblique cut-off line CL2 is located in the left side of the line V-V (a traveling lane side in the left-hand traffic). Accordingly, the low beam light distribution pattern PL is suitable for preventing a glare to pedestrians and other drivers in the left-hand traffic system. By forming a cut line pattern such that a horizontal cut-off line CL1 is located in the left side of the line V-V and an oblique cut-off line CL2 is located in the right side of the line V-V, it is also possible to form a low beam light distribution pattern suitable for the right-hand traffic.

The third sub-unit 150 is configured to form a high beam light distribution pattern PH. The high beam light distribution pattern PH is formed to extend, from a central region in front of the vehicle, in the horizontal direction below and above the line H-H. When the driver instructs the high beam, the high beam light distribution pattern PH is superimposed on the low beam light distribution pattern PL to form the high beam. Since the high beam light distribution pattern PH is formed in addition to the low beam light distribution pattern PL, the high beam light distribution pattern PH may be regarded as one of the additional light distribution patterns.

As described above, the projection lenses 112, 132, 152 have mutually different rear focal points F1, F2, F3. Each of the sub-units includes the light source module 118, 138, 158 and the reflector 120, 140, 160 having the first focal point located one or in the vicinity of the light source modules 118, 138, 158 and the second focal point located on or in the vicinity of the rear focal point F1, F2, F3. Thus, the projection lenses 112, 132, 152 can respectively project more accurate light distribution patterns than a case in which the projection lenses 112, 132, 152 have a common rear focal point. As a result, the headlamp 10 can form a more accurate light distribution pattern.

Further, the sub-units 110, 130, 150 form the different light distribution patterns respectively. Accordingly, various light distribution patterns that can be formed by the headlamp 10.

As described above, in the first lamp unit 100 according to this exemplary embodiment, the plurality of projection lenses 112, 132, 152 are arranged on the same plane. Further, one of the opposed outer peripheral portions of the adjacent projecting lenses has a contour extending along the other of the opposing outer peripheral portions. The projection lenses 112, 132, 152 are combined together such that the outer peripheral portions touch or lie close to each other, so that the light emitting areas of the projection lenses 112, 132, 152 as a whole are visually recognized as one light emitting area 100a. In other words, in the first lamp unit 100, the plurality of projection lenses 112, 132, 152 have the noncircular shapes in their front views. The projection lenses 112, 132, 152 are arranged so that the sides that cause the projection lenses 112, 132, 152 noncircular touch or lie close to each other. Thus, the light emitting areas of the projection lenses 112, 132, 152 as a whole are visually recognized as the one light emitting area 100a.

Therefore, as compared with the related art in which the auxiliary optical unit is provided to cause the light emitting areas of the plurality of units to be visually recognized as one light emitting area as a whole, the vehicle marking function of the vehicle lamp can be improved without increasing the number of components. Further, because the first sub-unit 110, the second sub-unit 130 and the third sub-unit 150 are visually recognized as a single light emitting part, the area of single light emitting part can be increased than that when the individual sub-units are visually recognized as individual light emitting parts. Thus, it is possible to avoid a situation where pedestrians or other drivers erroneously recognize a distance to the vehicle longer than it is, and to improve the function of calling attention of the pedestrians and other vehicles.

Further, the headlamp 10 according to this exemplary embodiment includes the first lamp unit 100 as the headlamp unit and the second lamp unit 200 as the indicating lamp unit. In the second lamp unit 200, at least a portion of its visually recognizable light emitting area 200a overlaps the visually recognizable light emitting area 100a of the first lamp unit 100. Accordingly, as compared with a vehicle headlamp in which the indicating lamp unit is spaced from the headlamp unit, it is possible to provide the headlamp 10 with an innovative design, thereby improving the attention calling function.

In the headlamp 10 according to this exemplary embodiment, the first lamp unit 00 and the second lamp unit 200 are combined to form the combination lamp unit having a substantially circular shape in a front view. Further, the lens holders 114, 134, 154 that partition the first lamp unit 100 and the second lamp unit 200 in a front view are the light guides, and output the light from the light source bulb 208 forward from the vehicle. Accordingly, it is possible to provide a combination lamp that gives integrated impression to the pedestrians and other drivers.

Second Exemplary Embodiment

Now, a second exemplary embodiment of the present invention will be described. Features of the second exemplary embodiment that are the same or similar to those of the first exemplary embodiment will be denoted by same reference signs, and detailed description and illustration will be omitted. In the vehicle headlamp according to the second exemplary embodiment, projection lenses 112, 132, 152 of a first lamp unit 100 share the same light source.

Figure 8:
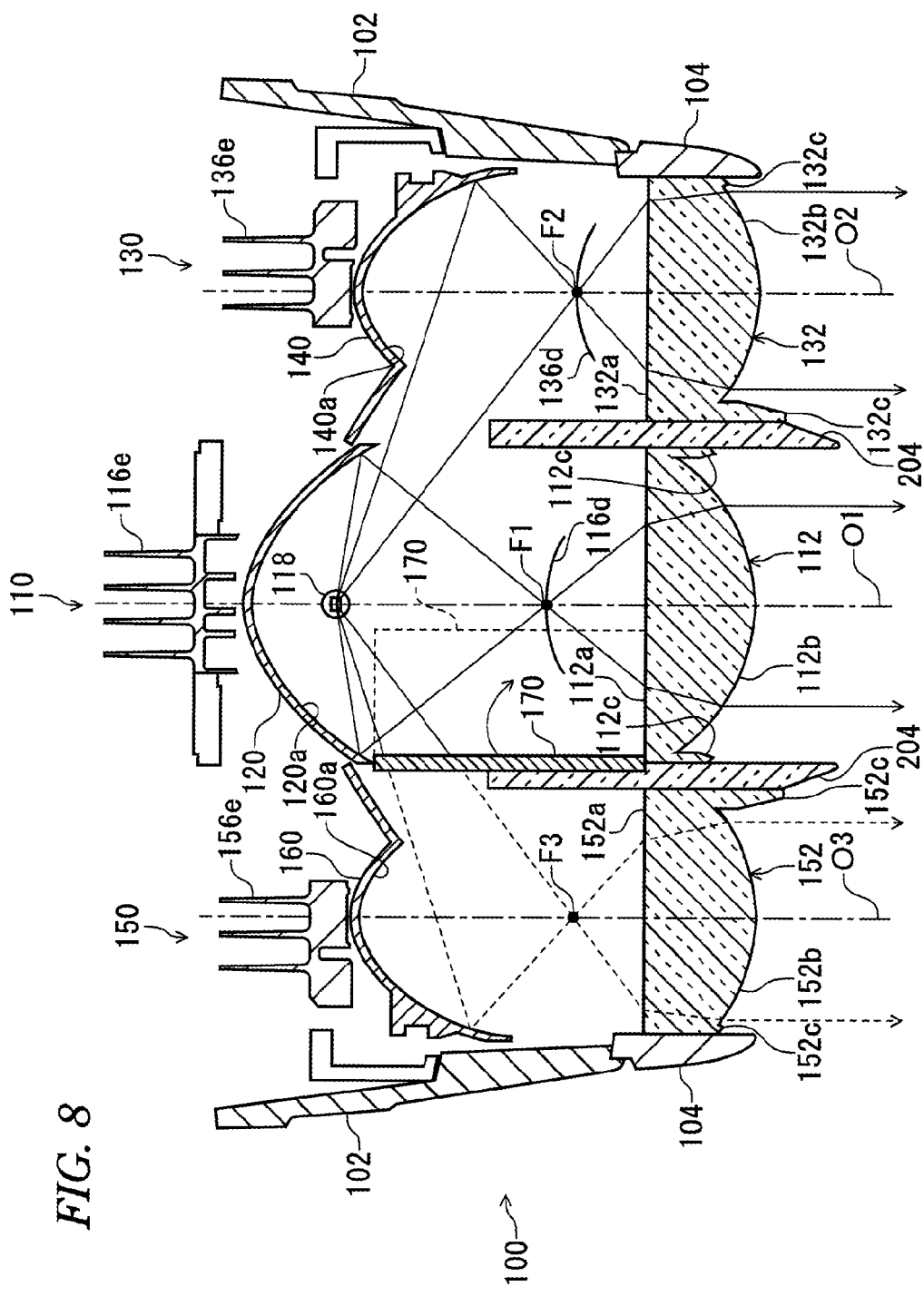
FIG. 8 is a horizontal sectional view of a first lamp unit according to a second exemplary embodiment of the present invention.

FIG. 8 is a horizontal sectional view of a first lamp unit 100 according to the second exemplary embodiment, taken along the line that corresponds to the line V-V of FIG. 1. As shown in FIG. 8, the first lamp unit 100 according to the second exemplary embodiment only has a light source module 118 in a first sub-unit 110 as a light source. The first sub-unit 110, a second sub-unit 130 and a third sub-unit 150 share the light source module 118.

The first lamp unit 100 includes a light shielding member 170 along a boundary between the first sub-unit 110 and the third sub-unit 150. The light shielding member 170 is a plat-like member, and is arranged to extend along a light guide 204 provided between the first sub-unit 110 and the third sub-unit 150. The light shielding member 170 is movable between a first position at which the light from the light source is blocked from entering the projection lens 152 of the third sub-unit 150 and a second position at which the light from the light source is permitted to enter the projection lens 152. As shown FIG. 8, the light shielding member 170 may be moved from the first position (shown in solid lines) to the second position (shown in broken lines) be inclining the light shielding member 170 down toward the first sub-unit 110 around its lower side portion extending in the direction of the optical axis O1. In this case, the light shielding member 170 is moved from the second position to the first position by lifting the light shielding member 170 up around its the lower side portion.

The light shielding member 170 is moved between the first position and the second position by an actuator (not shown) such as a solenoid. When a solenoid is used as the actuator, the solenoid may be configured to include a spring or the like therein such that, while no power is supplied to the solenoid so that the solenoid is not being controlled, the spring moves and maintains the light shielding member 170 in the first position. This is advantageous in that, when an abnormality is generated in the actuator, the high beam light distribution pattern PH can be reliably prevented from being produced. That is, even when the light shielding member 170 becomes out of control, a glare can be prevented from being given to other vehicles or pedestrians.

The light shielding member 170 may be configured to slide in the direction of the optical axis O1 so that the light shielding member 170 slides backward when moving from the first position to the second position. Alternatively, the light shielding member 170 may be configured to rotate about a rear end portion of the light shielding member 170 in a plane including the light shielding member 170 so that the light shielding member 170 rotates toward the rear in the direction of the optical axis O1 when moving from the first position to the second position.

Now, operations of the headlamp 10 having the configuration described above will be described. In FIG. 8, arrow marks show light rays. When a driver operates a light switch to instruct a low beam, a vehicle control ECU or a lamp ECU controls a power circuit to turn on the light source module 118 and to move the light shielding member 170 to the first position, whereby the light source module 118 is supplied with electric power to emit light and the light shielding member 170 is moved to the first position.

A portion of the light from the light source module 118 is reflected by a reflecting surface 120a of a reflector 120 to travel a rear focal point F1 and to enter a light input surface 112a of the projection lens 112, and is output from a light output surface 112b of the projection lens 112 so as to be directed forward from the vehicle. Another portion of the light from the light source module 118 entering the second sub-unit 130 is reflected by a reflecting surface 140a of a reflector 140 to travel near a rear focal point F2 and to enter a light input surface 132a of the projection lens 132, and is output from a light output surface 132b the projection lens 132 so as to be directed forward from the vehicle. The light shielding member 170 blocks the light from the light source module 118 from entering the third sub-unit 150. Accordingly, the light is not output from the third sub-unit 150. Thus, the low beam light distribution pattern PL is formed in which the diffused pattern P1 and the cut line pattern P2 are combined.

When the driver operates the light switch to instruct a high beam, the vehicle control ECU or the lamp ECU controls the power circuit to turn on the light source module 118 and to move the light shielding member 170 to the second position, whereby the light source module 118 is supplied with electric power to emit light and the light shielding member 170 is moved to the second position.

In this case, a portion of the light from the light source module 118 is output from the light output surface 112b of the projection lens 112 so as to be directed forward from the vehicle. Another portion of the light from the light source module 118 is output from the light output surface 132b of the projection lens 132 so as to be directed forward from the vehicle. Yet another portion of the light from the light source module 118 entering the third sub-unit 150 is reflected by a reflecting surface 160a of a reflector 160 to travel near a rear focal point F3 and to enter a light input surface 152a of the projection lens 152, and is output from a light output surface 152b the projection lens 152 so as to be directed forward from the vehicle. Thus, the low beam light distribution pattern PL and a high beam light distribution pattern PH are formed and they are superimposed on each other.

In the first lamp unit 100 according to this exemplary embodiment, when the light shielding member 170 is at the first position, the low beam light distribution pattern PL is projected by the projection lenses 112, 132. Further, when the light shielding member 170 is located at the second position, the low beam light distribution pattern PL is projected by the projection lenses 112, 132 and the high beam light distribution pattern PH is projected by the projection lens 152 and is superimposed on the low beam light distribution pattern PL. Thus, even when the plurality of sub-units are provided, the number of light source modules can be reduced, and therefore, a production cost of the first lamp unit 100 can be suppressed.

In this exemplary embodiment, the three projection lenses 112, 132, 152 share the same light source, however, only two of the projection lenses 112, 132, 152 may share the same light source. For example, the projection lenses 112, 152 may share the light source module 118 and a light source module 138 may be provided for the projection lens 132.

As described above, in the first lamp unit 100 according to this exemplary embodiment, the projection lenses 112, 132, 152 share the same light source. Further, the first lamp unit 100 includes the light shielding member 170 that can block the light from the light source front entering the projection lens 152. The formation of the high beam light distribution pattern PH is controlled by moving the light shielding member 170 between the first position and the second position. In this way, in the first lamp unit 100 according to this exemplary embodiment, the plurality of sub-units shares the light source. Therefore, the production cost of the first lamp unit 100 can be suppressed. Further, the number of components of the first lamp unit 100 can be reduced than a case in which the light sources are provided for the respective sub-units. Accordingly, a production process of the first lamp unit 100 can be simplified.

While the present invention has been described with reference to certain exemplary embodiments thereof, the scope of the present invention is not limited to the exemplary embodiments described above, and it will be understood by those skilled in the art that various changes and modifications may be made therein, or the exemplary embodiments may be combined, without departing from the scope of the present invention as defined by the appended claims.

Figure 9:
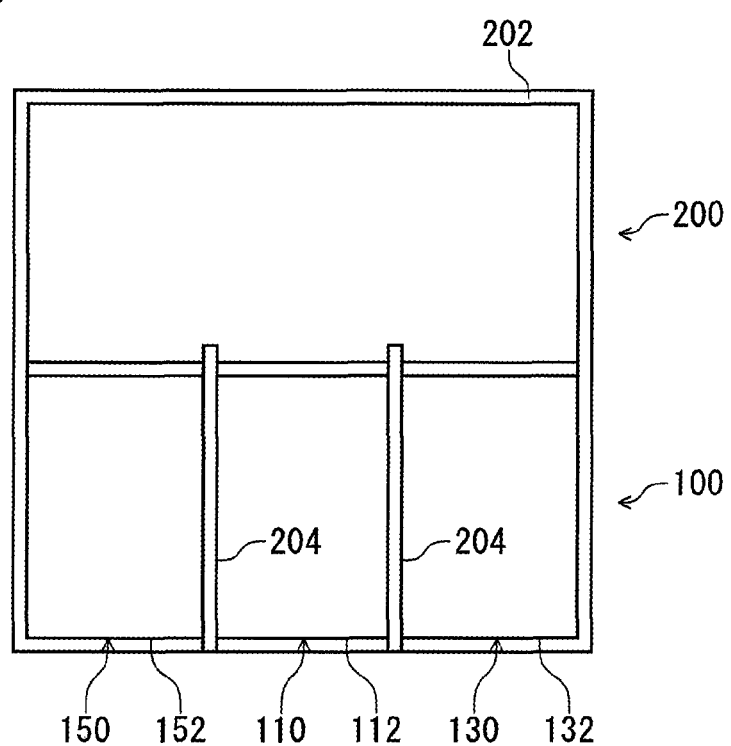
FIG. 9 is a schematic front view of a headlamp according to a modified example.

For example, FIG. 9 is a schematic front view of a vehicle headlamp according to a modified example. In FIG. 9, illustrations of a lamp body 12 and an outer cover 14 are omitted. As shown in FIG. 9, the headlamp 10 according to this modified example includes a first lamp unit 100 having a substantially rectangular shape in a front view and a second lamp unit 200 having a substantially rectangular form in a front view. The first lamp unit 100 and the second lamp unit 200 are provided such that a lower side of the second lamp unit 200 touches an upper side of the first lamp unit 100. Further, each of the projection lenses 112, 132, 152 has substantially rectangular shape in their front views, and are arranged such that their long sides lie close to each other. Two light guides 204 are arranged in a gap between the projection lens 112 and the projection lens 132 and in a gap between the projection lens 112 and the projection lens 152 so as to extend in the vertical direction and in parallel. This configuration also provides advantageous effects as those in the exemplary embodiments described above.

In the exemplary embodiments described above, the first lamp unit 100 forms the low beam light distribution pattern PL and the high beam light distribution pattern PH, however, the first lamp unit 100 may form at least one of the low beam light distribution pattern PL and the high light distribution pattern PH. For example, the low beam light distribution pattern PL may be formed by a first sub-unit 110 and a second sub-unit 130 and additional light distribution pattern such as a light distribution pattern for irradiating a region ahead of a curved road may be formed by a third sub-unit 150. Alternatively, for example, the low beam light distribution pattern PL and the high beam light distribution pattern PH may be formed by the first lamp unit 100 and the additional light distribution pattern for irradiating the region ahead of the curved road may be formed by the second lamp unit 200.

In the exemplary embodiments described above, the first sub-unit 110, the second sub-unit 130 and the third sub-unit 150 are combined together so that the opposed outer peripheral portions of the projection lenses 112, 132, 152 lie to each other. The light guides 204 are arranged to extend between the closely arranged outer peripheral portions. However, the structure of the headlamp 10 is not limited thereto. For example, the light guides 204 may not be provided, and the projection lenses 112, 132, 152 may be arranged to touch one another. In this case, the projection lenses 112, 132, 152 may be formed as a one-piece structure.

In another example, the first lamp unit 100 may have more sub-units, and may be configured such that substantially sector shaped projection lenses are combined together such that an entire shape of the first lamp unit 100 is a substantially circular shape in a front view. In this case, the second lamp unit 200 may be arranged in a center of the circle of the first lamp unit 100, and a plurality of light guides 204 may be arranged to extend radially from the center of the circle. The "substantially circular shape" includes not only a shape of a true circle but also a shape close to a circle, for example, a shape having a dimensional error during the production of the projection lens. Further, the shape of each the projection lenses 112, 132, 152 is not limited to the substantially sector shape or the substantially rectangular shape. For example, the projection lens 112 may have a substantially circular shape including an elliptic shape and each of the projection lenses 132, 152 may have an outer peripheral portion lying close to the projection lens 112 and curved along the circular arc of the projection lens 112.

What is claimed is:

1. A vehicle headlamp unit comprising:
    at least one light source; a transparent light guide configured to introduce light from another lamp unit, wherein the light guide is arranged between the outer peripheral portions of the projection lenses; and
    a plurality of projection lenses configured to project light from the at least one light source,
    wherein the plurality of projection lenses is configured and arranged such that each of the projection lenses comprises an outer peripheral portion that faces and extends along an outer peripheral portion of an adjacent one of the projection lenses,
    wherein the outer peripheral portion of each of the projection lenses touches or lies close to the outer peripheral portion of the adjacent one of the projection lenses such that light emitting areas of the plurality of projection lenses as a whole are visually recognized as a single light emitting area,
    wherein each of the projection lenses has a noncircular shape when observed from a front view, and wherein the outer peripheral portion of each of the projection lenses comprises a side that causes the shape of the projection lens to be noncircular,
    wherein the plurality of projection lenses has different rear focal points, and
    wherein the side of the each of the projection lenses comprises a straight line section and wherein the straight line section of the each of the projection lenses faces the straight line section of the adjacent one of the projection lenses.

2. The vehicle headlamp unit according to claim 1, wherein at least two of the projection lenses are configured to project different light distribution patterns.

3. The vehicle headlamp unit according to claim 1, wherein the plurality of projection lenses comprises a first projection lens and a second projection lens, wherein the first and second projection lenses share the light source.

4. A vehicle headlamp unit comprising:
    at least one light source; a transparent light guide configured to introduce light from another lamp unit, wherein the light guide is arranged between the outer and peripheral portions of the projection lenses;
    a plurality of projection lenses configured to project light from the at least one light source; and
    a light shielding member configured to move between a first position and a second position,
    wherein the plurality of projection lenses is configured and arranged such that each of the projection lenses comprises an outer peripheral portion that faces and extends along an outer peripheral portion of an adjacent one of the projection lenses,
    wherein the outer peripheral portion of each of the projection lenses touches or lies close to the outer peripheral portion of the adjacent one of the projection lenses such that light emitting areas of the plurality of projection lenses as a whole are visually recognized as a single light emitting area,
    wherein the plurality of projection lenses comprises a first projection lens and a second projection lens, wherein the first and second projection lenses share the light source,
    wherein, when the light shielding member is at the first position, light from the light source is blocked from entering the second projection lens so that a first light distribution pattern is projected from the first projection lens,
    wherein, when the light shielding member is at the second position, the light from the light source enters the second projection lens so that a second light distribution pattern is projected from the second projection lens and is superimposed on the first light distribution pattern, wherein the outer peripheral portion of each of the projection lenses comprises a side that causes the shape of the projection lens to be noncircular, wherein the side of the each of the projection lenses comprises a straight line section, and wherein the straight section of the each of the projection lenses faces the straight line section of the adjacent one of the projection lenses.

5. The vehicle headlamp unit according to claim 1, wherein each of the projection lenses has a substantially sector shape when observed from the front view, and wherein the plurality of projection lenses is arranged such that the headlamp unit as a whole has a substantially circular shape or a substantially sector shape when observed from the front view.

6. The vehicle headlamp unit according to claim 1, wherein the plurality of projection lenses is arranged on a plane.

7. A vehicle headlamp unit comprising:

at least one light source; a transparent light guide configured to introduce light from another lamp unit, wherein the light guide arranged between the outer peripheral portions of the projection lenses; and a plurality of projection lenses configured to project light from the at least one light source, wherein each of the projection lenses has a noncircular shape when observed from a front view, and comprises a side that causes the shape of the projection lens to be noncircular, wherein the side of each of the projection lenses touches or lies close to the side of an adjacent one of the projection lenses such that light emitting areas of the plurality of projection lenses as a whole are visually recognized as a single light emitting area, wherein the plurality of projection lenses has different rear focal points, and wherein the side of the each of the projection lenses comprises a straight line section, and wherein the straight line section of the each of the projection lenses faces the straight line section of the adjacent one of the projection lenses.

8. The vehicle headlamp unit according to claim 1, wherein the each of the projection lenses comprises a sector shape of a circle.

9. The vehicle headlamp unit according to claim 4, the each of the projection lenses comprises a sector shape of a circle.

10. The vehicle headlamp unit according to claim 7, the each of the projection lenses comprises a sector shape of a circle.

* * * * *